Patented May 31, 1932

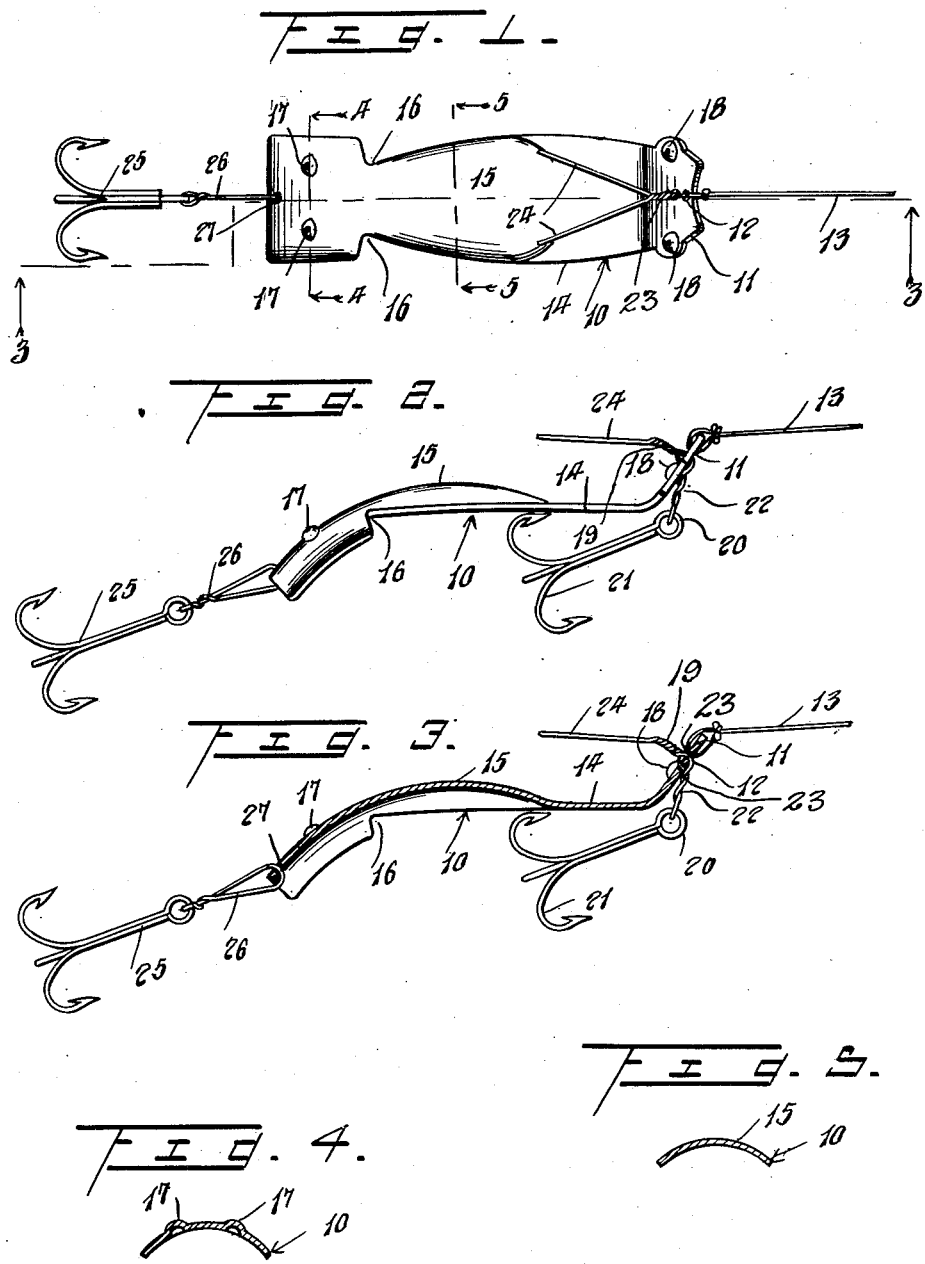

1,861,110

UNITED STATES PATENT OFFICE

WILLIAM M. CAMPBELL, OF SAGINAW, MICHIGAN

ARTIFICIAL FISH BAIT

Application filed April 25, 1929, Serial No. 358,061. Renewed October 22, 1931.

This invention relates to an artificial fish bait.

It is aimed to provide a novel construction of device of this character which will have a leaping action when drawn over the water or trolled.

It is aimed to provide a novel construction of bait attaining the end aforesaid primarily capable of manufacture in a single piece from metal or other material and adapted to be painted or ornamented in accordance with any desired color scheme, and be provided with one or more hooks.

The more specific objects and advantages will become apparent from a consideration of the description following taken in connection with accompanying drawings illustrating an operative embodiment, and wherein:

Figure 1 is a plan view of the bait,

Figure 2 is a side elevation thereof,

Figure 3 is a longitudinal sectional view taken on the line 3—3 of Figure 1, and Figures 4 and 5 are detail cross sectional views taken on the lines 4—4 and 5—5 of Figure 1, respectively.

Referring specifically to the drawings, the bait primarily comprises a body 10 which is preferably made in a single piece preferably of metal or other material. This body has an upwardly and forwardly inclined head 11 which is apertured as at 12 so that the bait may be fastened to the usual fishing line 13. For a short distance in the rear of the head 11, the body has a flat portion 14 and extending from the same is a rearwardly and downwardly extending portion 15, which is arcuate or cambered both longitudinally and transversely, such portion being preferably cut away at its sides as at 16 so as to better give the appearance of the body of an insect or the like. The rearmost portion as well as the head 11 may have outwardly struck beads 17 and 18, respectively, to simulate eyes of an insect.

A body of the character described when trolling or drawn over the water, leaps and accordingly produces a series of short leaps and by this action, the device overcomes wiggling.

The body is preferably equipped with one or more hooks in any preferred manner. For instance, a wire 19 is formed into an eyelet 20 loosely suspending a gang hook 21. Above eyelet 20, the wire 19 is coiled together as at 22 and passes through openings 23 in the head 12, being loose in such head, and the terminals of the wire extend rearwardly and diverge in the form of feelers 24.

At the rear end, a gang hook 25 may be fastened as by a wire 26 to the body 10, the wire passing loosely through an opening 27 therein.

Various changes may be resorted to provided they fall within the spirit and scope of the invention.

I claim as my invention:

1. A bait of the class described having a body adapted to be drawn through the water, said body having openings therethrough, a wire coiled together intermediate of its ends providing an eyelet, the ends of the wire passed through said openings and again coiled together whereby it is attached to the body, said wire having terminals substantially in diverging relation above the body to form feelers, and a hook supported by said eyelet.

2. A bait of the class described having a body adapted to be drawn through the water, said body having openings therethrough, a wire coiled together intermediate of its ends providing an eyelet, the ends of the wire passed through said openings and again coiled together whereby it is attached to the body, said wire having terminals substantially in diverging relation above the body to form feelers, a hook supported by said eyelet, a longitudinally and transversely cambered portion rearwardly of said head to cause the body to leap when drawn through the water, and a hook carried by said portion.

3. A bait of the class described having a body adapted to be drawn through the water, said body having openings therethrough, a wire coiled together intermediate of its ends providing an eyelet, the ends of the wire passed through said openings and again coiled together whereby it is attached to the body, said wire having terminals substantially in diverging relation above the body to form feelers, a hook supported by said eyelet, a longitudinally and transversely cambered portion rearwardly of said head to cause the body to leap when drawn through the water, a hook carried by said portion, said head having an opening whereby a line may be attached thereto, and said head at said portion having struck out elements constituting eyes.

In testimony whereof I affix my signature.

WILLIAM M. CAMPBELL.